United States Patent
Roberts et al.

(10) Patent No.: US 7,599,400 B2
(45) Date of Patent: Oct. 6, 2009

(54) METHODS AND SYSTEMS FOR REDUCING WAITING-TIME JITTER

(75) Inventors: Kim B. Roberts, Nepean (CA); Chandra Bontu, Nepean (CA); James Harley, Nepean (CA)

(73) Assignee: Nortel Networks Limited, St. Laurent, Quebec (CA)

(*) Notice: Subject to any disclaimer, the term of this patent is extended or adjusted under 35 U.S.C. 154(b) by 597 days.

(21) Appl. No.: 11/218,430

(22) Filed: Sep. 6, 2005

(65) Prior Publication Data

US 2007/0053384 A1    Mar. 8, 2007

(51) Int. Cl.
*H04J 3/06*    (2006.01)
(52) U.S. Cl. .................. 370/516; 370/503
(58) Field of Classification Search .......... 370/503, 370/516, 352, 526, 286, 285, 493, 254, 210, 370/312; 708/313; 375/271, 372, 96, 376, 375/354, 86; 348/466; 327/108, 149; 331/16
See application file for complete search history.

(56) References Cited

U.S. PATENT DOCUMENTS

| | | | | |
|---|---|---|---|---|
| 4,234,957 A * | 11/1980 | Tracey et al. | ........ | 375/332 |
| 4,860,321 A * | 8/1989 | von der Embse | ........ | 375/343 |
| 5,180,993 A * | 1/1993 | Dent | ........ | 331/16 |
| 5,621,341 A * | 4/1997 | Schrader et al. | ........ | 327/102 |
| 5,668,803 A * | 9/1997 | Tymes et al. | ........ | 370/312 |
| 5,757,857 A * | 5/1998 | Buchwald | ........ | 375/271 |
| 5,854,660 A * | 12/1998 | Tichelaar | ........ | 348/466 |
| 6,226,661 B1* | 5/2001 | Savell | ........ | 708/313 |
| 6,377,640 B2* | 4/2002 | Trans | ........ | 375/354 |
| 6,819,727 B1* | 11/2004 | Cucchi et al. | ........ | 375/372 |
| 2003/0026372 A1* | 2/2003 | Boerstler et al. | ........ | 375/376 |
| 2004/0070431 A1* | 4/2004 | Henrickson | ........ | 327/149 |
| 2005/0258908 A1* | 11/2005 | Mitric | ........ | 331/16 |
| 2006/0013262 A1* | 1/2006 | Downey et al. | ........ | 370/503 |

\* cited by examiner

*Primary Examiner*—Kwang B Yao
*Assistant Examiner*—Syed Bokhari
(74) *Attorney, Agent, or Firm*—Kent Daniels; Blake, Cassels & Graydon LLP (57) ABSTRACT

A method of minimizing jitter in a system for rate adapting a data signal for transport through a synchronous network. A phase difference is measured between a data clock synchronous with the data signal and a local clock of the synchronous network. A timing reference (F) indicative of a frequency difference between the asynchronous data signal and the local clock is measured using the measured phase difference. Calculation of the timing reference includes compensating ambiguity in the measured phase difference.

12 Claims, 7 Drawing Sheets

METHODS AND SYSTEMS FOR REDUCING WAITING-TIME JITTER

CROSS-REFERENCE TO RELATED APPLICATIONS

This is the first application filed for the present invention.

MICROFICHE APPENDIX

Not Applicable.

TECHNICAL FIELD

This invention relates to communications networks, and in particular to methods and systems for reducing waiting-time jitter.

BACKGROUND OF THE INVENTION

Within the modern network space, the Synchronous Optical Network (SONET)/Synchronous Digital Hierarchy (SDH) protocol is becoming increasingly popular as a mechanism for data transport. In this respect, SDH is the European equivalent of the SONET transmission standard. Accordingly, all references in this application to SONET should be understood to also refer to SDH.

A significant amount of SONET/SDH infrastructure has been installed, particularly within the network core. This SONET infrastructure is used to transport asynchronous subscriber signal traffic having differing formats, such as Asynchronous Transfer Mode (ATM), Internet Protocol (IP), etc. In order to facilitate this functionality, various known methods are provided for mapping the asynchronous subscriber traffic into Synchronous Transfer Signal (STS/STM) frames for transport across the SONET infrastructure, and then extracting the subscriber traffic out of the STS to recover the original subscriber signal format.

Figure 1:
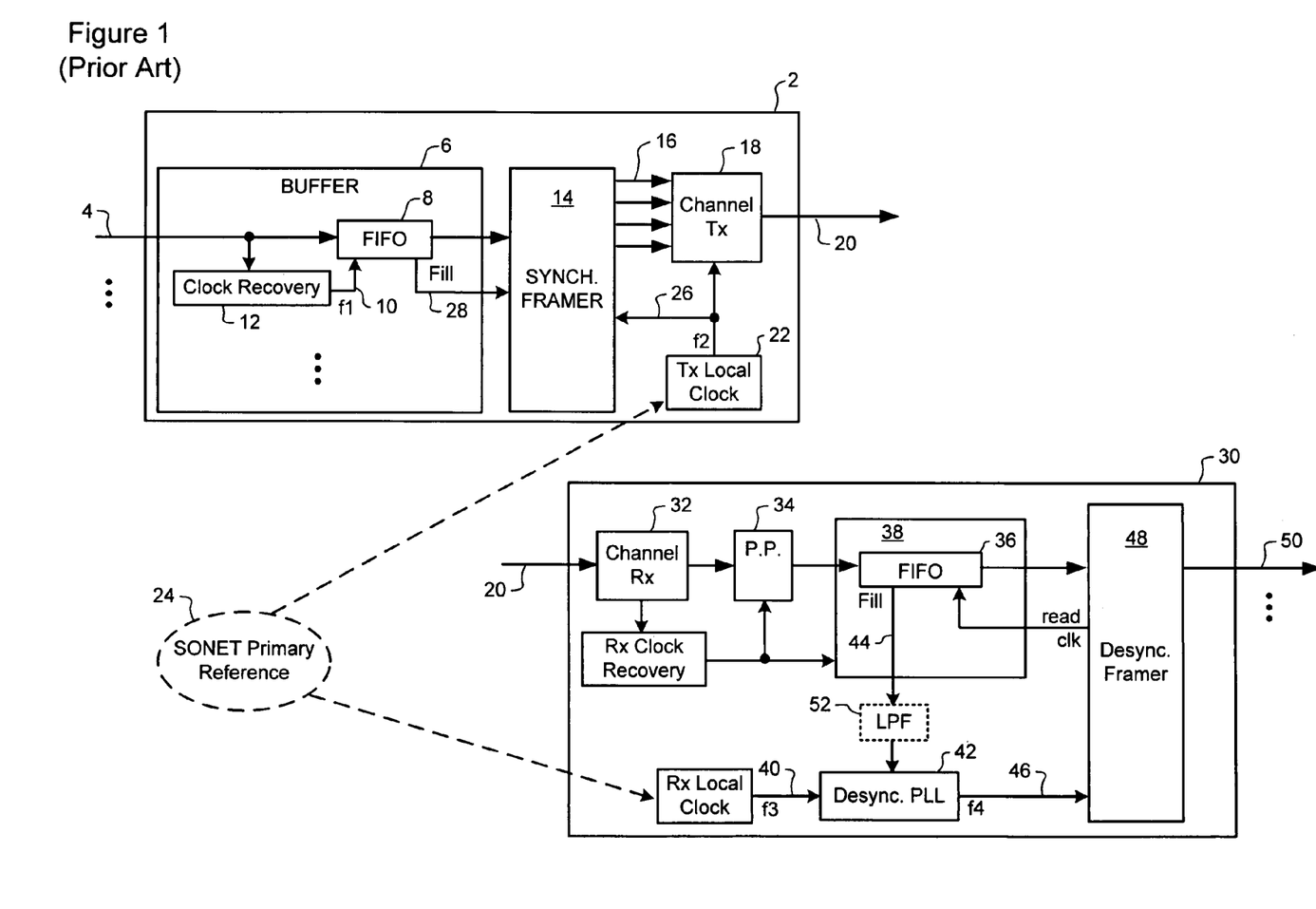
FIG. 1 is a block diagram schematically illustrating conventional originating and terminating nodes of an optical communications network.

FIG. 1 is a block diagram schematically illustrating principal operations of conventional transmitting and terminating nodes 2 and 30 of an optical communications system. As shown in FIG. 1, asynchronous subscriber traffic within multiple tributaries 4 is received by the transmitting node 2 and buffered in an elastic store 6. The traffic may comprise any arbitrary mix of signals, including DS-1, DS-3 and E1 traffic. Traffic within each tributary 4 is normally stored in a respective First-In-First-Out (FIFO) buffer 8. The timing of this buffering operation is controlled by a data clock signal 10 having a frequency f1 generated by a tributary clock recovery circuit 12 in a manner well known in the art. A synchronizing framer 14 reads data from each FIFO 8, and maps the read data into corresponding tributaries of a number of SONET Synchronous Payload Envelopes (SPEs) 16, using a known format such as those defined in the SONET standard. Each SPE 16 is then passed to a channel transmitter (Tx) 18, which inserts the SPEs into an STS frame 20, and then modulates the STS frame 20 onto an optical channel carrier for transmission through the optical network. A Tx local clock 22, which is synchronous with a SONET Primary Reference 24, generates a respective TX local clock signal 26 having a frequency f2, which is used to control operation of the synchronizing framer 14 and channel Tx 18.

Normally, a respective FIFO-fill signal 28 is generated for each tributary FIFO 8, and used to control the insertion of stuff bytes into the corresponding SPE tributary.

At the terminating node 30, the incoming STS 20 is decoded by a channel receiver (Rx) 32 and processed by a pointer processor 34 to demap each SPE tributary from the STS 20. Thus, stuff bytes are stripped out of each tributary, and the remaining subscriber data stored in a respective tributary FIFO 36 of an elastic store 38. An Rx local clock signal 40, having a frequency f3 which is preferably referenced to the SONET Primary Reference 24, is supplied to a desynchronizer Phase locked Loop (PLL) 42. A FIFO-fill signal 44 generated by the tributary FIFO 36 is used to steer the Phase locked Loop (PLL) 42, so that the PLL output constitutes a recovered data clock signal 46 having a frequency f4 which approximates the data rate of the tributary 4 subscriber traffic. As a result, by reading data from the tributary FIFO 36 at a timing of the recovered data clock 46, a desynchronizer framer 48 can generate a recovered subscriber signal 50 in which the original timing is closely approximated.

For cases in which the channel line rate is equal to or greater than the subscriber data rate (i.e. for f1≦f2), the introduction of stuff bytes by the synchronizing framer 14 enables the synchronizing and desynchronizing framers 14 and 48 to compensate differences between the tributary data rate and the channel rate. However, this mapping technique suffers a limitation in that the FIFO-fill signals 28 and 44 in the Tx and Rx tend to vary in a step-wise manner as stuff bytes are inserted and striped from SPE tributaries. This causes waiting time jitter in the recovered subscriber signal 50.

In most situations, the amount of waiting time jitter introduced by mapping and demapping asynchronous client signal traffic to and from STS frames does not create any difficulties. However, if the timing of the subscriber signal is critical, such as an HDTV signal or a subscriber-originated SONET signal (e.g. for SONET over SONET applications) the introduced jitter can noticeably degrade the quality of the subscriber's signal. Accordingly, there is interest in methods that enable subscriber traffic to be transparently mapped on to SONET STS signals. An important aspect for transparency is to preserve the original timing information of the subscriber signal.

Known methods of reducing waiting time jitter include filtering the FIFO fill 44 using a low-pass filter 52, and/or introducing a "dead-band" (not shown) in the desynchronizer PLL 42. Such a dead-band is used to attenuate the response of the PLL 42 to changes in the FIFO fill signal 44 corresponding to removal of stuff bytes. A limitation of this approach is that it only works for a limited range of tributary data and local clock frequencies. In fact, actual elimination of waiting time jitter by this approach requires that $$\frac{f1}{f2} = \frac{f1}{f3} = 1,$$

in which case no rate adaptation is taking place. Use of frequency dividers and multipliers within the Tx and Rx enable other (more useful) frequency ratios (such as, for example $$\frac{nf1}{mf2} \approx \frac{nf1}{mf3} \approx 1,$$

where n and m are positive integers) to be employed. However, the utility of this approach is still restricted to a very limited set of discrete frequency ratios, and these ratios must be known at the time of installation of the Tx and Rx equipment. In many cases, it is desirable to be able to perform rate adaptation across a wide range of different frequency ratios, which may or may not be known in advance.

Figure 2:
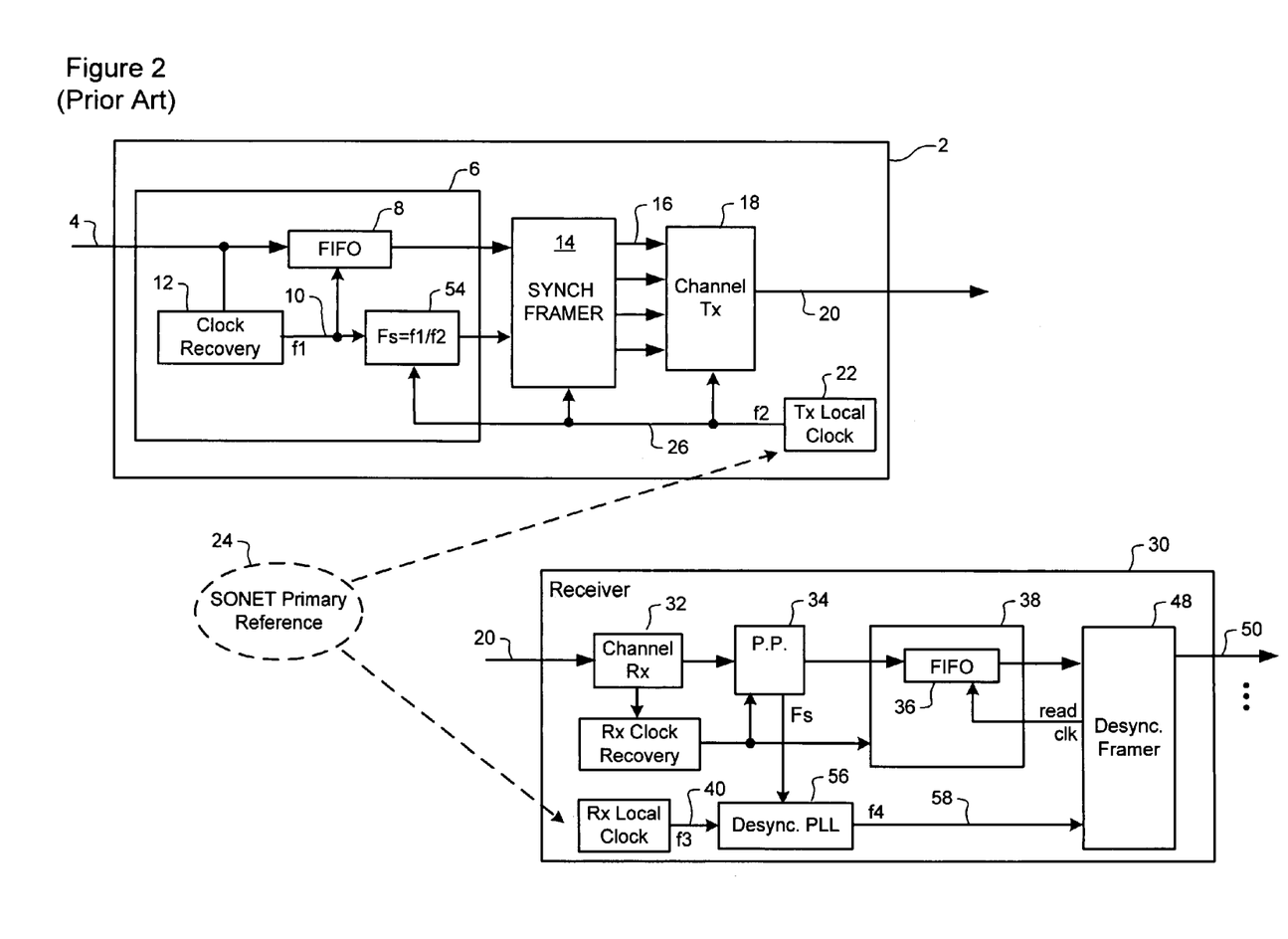
FIG. 2 is a block diagram schematically illustrating originating and terminating nodes known from U.S. patent application Ser. No. 09/972,686.

Applicant's co-pending U.S. patent application Ser. No. 09/972,686 (Roberts et al.), entitled Method and Apparatus for Digital Data Synchronization, which was filed on Oct. 9, 2001, teaches a method of rate adapting an asynchronous subscriber signal on to SONET STS frames without incurring waiting time jitter, by measuring the phase and frequency of the (asynchronous) subscriber signal and encoding this information into the frame overhead. Thus, as shown in FIG. 2, a multi-bit digital timing estimate (Fs) is calculated (at 54) to indicate the difference between the tributary data rate f1, and the Tx local clock frequency f2. In the embodiment of FIG. 2, the timing estimate Fs is computed as a ratio between f1 and f2. In other embodiments, the timing estimate Fs may be computed as a phase difference between the data clock signal 10 and the Tx local clock signal 26, calculated at the time that a corresponding tributary data block is mapped into the SPE. In either case, the timing estimate Fs is supplied to the synchronizing framer 14 and used in place of the FIFO-fill 28 to control the insertion of stuff bytes into the SPE tributary. The timing estimate Fs is also inserted into the SPE tributary and conveyed with the subscriber data to the terminating node 30.

At the terminating node 30, the pointer processor 34 demaps each SPE tributary, and extracts the timing estimate Fs. The timing estimate Fs extracted from the SPE tributary is used in place of the FIFO-fill signal 44 to steer the desynchronizer Phase locked Loop (PLL) 56. Consequently, the PLL output constitutes a recovered data clock signal 58 having a frequency f4 which more closely approximates the original frequency f1 of the subscriber traffic. As a result, by reading subscriber data from the tributary FIFO 36 at a timing of the recovered data clock 58, the desynchronizer framer 48 can generate a recovered subscriber signal 50 in which the original timing is substantially restored.

Applicant's co-pending U.S. patent application Ser. No. 10/609,562 (Roberts et al.), entitled Digital Processing Of SONET Pointers, teaches an improved version of the system of U.S. patent application Ser. No. 09/972,686 (Roberts et al.), in which pointer processing is used to address timing artefacts arising from a frequency difference (Δf) between the Tx and Rx local clock signals 26 and 40. Such a situation may, for example, arise in cases where the transmitting and receiving nodes 2 and 30 are located in different SONET islands.

Figure 3:
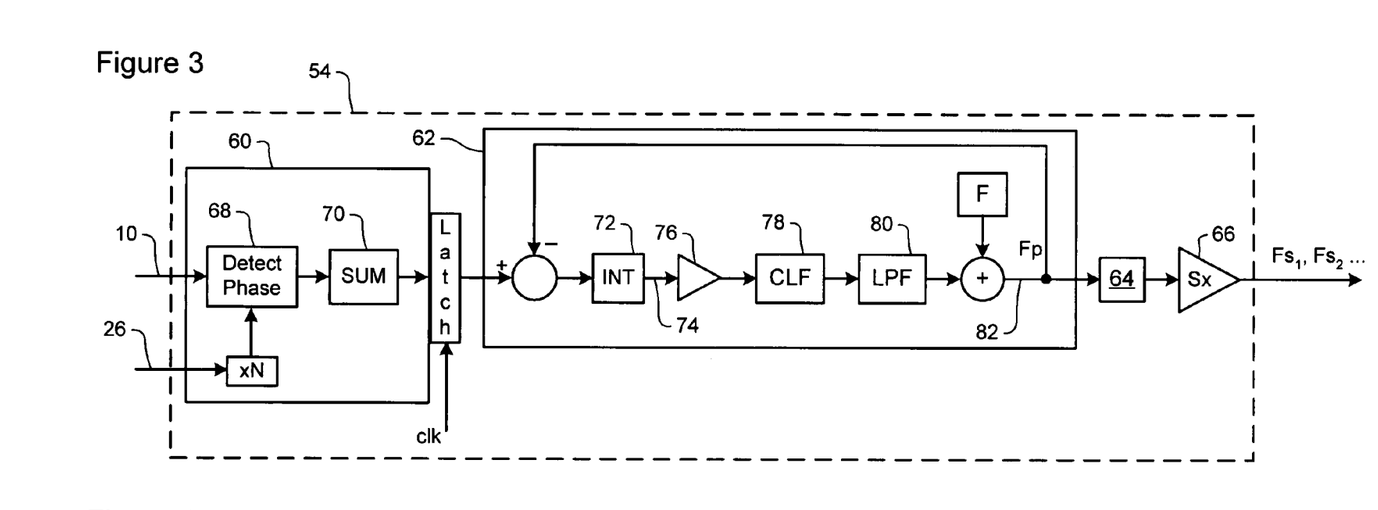
FIG. 3 is a block diagram schematically illustrating a circuit for calculating the timing estimate Fs in the originating node of FIG. 2.
Figure 4:
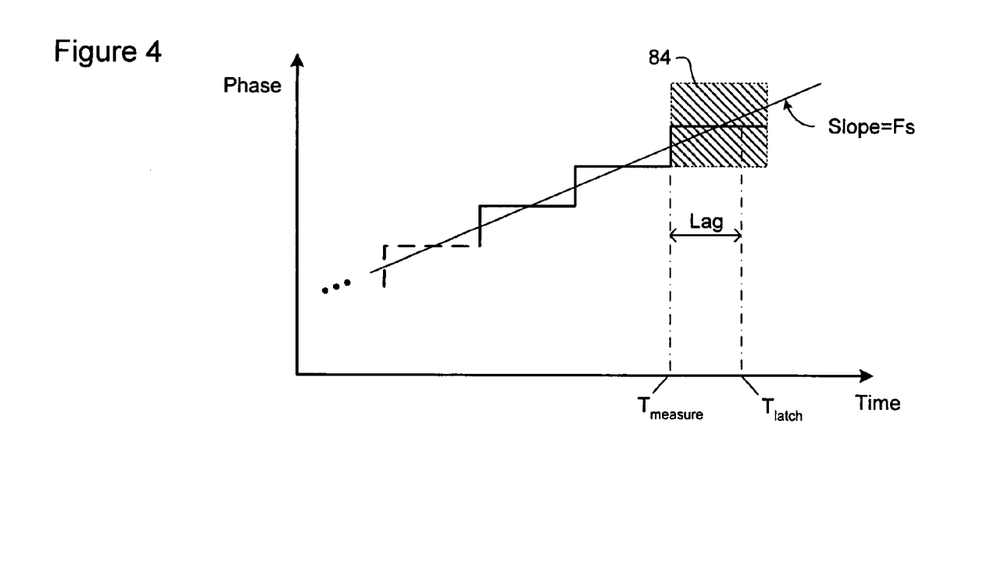
FIG. 4 is a chart illustrating the zone of ambiguity in phase difference measurements resulting from quantization errors and variations in timing lag.

Referring now to FIGS. 3 and 4, in the systems of Applicant's co-pending U.S. patent application Ser. Nos. 09/972,686 and 10/609,562, it is convenient to calculate the timing estimate Fs using a detection circuit 60 to compute successive samples of the frequency ratio f1/f2 from the data clock signal 10 and the Tx local clock signal 26, and then latching the frequency ratio samples into a digital Phase Locked Loop (PLL) 62. The PLL output is then accumulated over a predetermined period (at 64), and the result scaled (at 66) to yield successive values of the timing estimate Fs.

One method of implementing the detection circuit 60 is by over-sampling (at 68) the instantaneous phase of the data clock 10, relative to the local Tx clock 26, at a rate of N (e.g. N=8) times the local Tx clock 26. The individual phase samples are accumulated (at 70) over a predetermined number of samples (e.g. one cycle of the local Tx clock 26), to yield an incremental phase difference value $p_i$, which is proportional to the frequency ratio f1/f2 over that clock cycle. As may be seen in FIG. 4, integrating the successive incremental phase difference samples $p_i$ output by the detection circuit 60 yields a "stair-case" function of the accumulated phase difference vs. time, the mean slope of which is directly proportional to the ratio f1/f2 between the data clock 10 and the local Tx clock 26. The phase detection circuit 60 output is periodically latched into the PLL 62, e.g. at a timing of the local Tx clock 26, as the phase measurement $p_i$.

In general, the PLL 62 implements a low-pass filter function having a wide bandwidth, which produces a multi-bit predicted timing estimate (Fp) which is proportional to the frequency ratio f1/f2, from the successive $p_i$ samples output by the detection circuit 60. At the PLL input, the predicted timing estimate Fp is subtracted from the incremental phase difference sample $p_i$ obtained from the detection circuit 60, to obtain a corresponding incremental phase error value, which is integrated (at 72) to yield a phase error signal 74, which is then scaled (at 76), filtered by a loop filter 78 and a low pass filter 80 and then added (at 81) to an expected average frequency ratio (F) to yield an updated predicted timing estimate Fp 82 at the PLL output. Accumulating and scaling the predicted timing estimate Fp values (at 64 and 66) yields successive values of the timing estimate Fs. The update rate of the PLL 62 may be derived from the local Tx clock 26.

The arrangement of FIG. 3 is advantageous in that it can reliably calculate a mutibit value of the timing estimate Fs over a very wide (and substantially continuous) range of frequency differences (or ratios) between the data clock signal 10 and the Tx local clock signal 26.

However, experience with this system has brought to light a limitation in that calculation of the timing estimate Fs is subject to error due to ambiguity in the incremental phase difference measurement $p_i$ output from the detection circuit 60. A first source of such ambiguity is quantization error of the phase measurement obtained by the phase detector 68. Quantization errors are well understood in the art. A more subtle source of phase ambiguity is the lag ΔT between the time $T_{measure}$ when the phase difference measurement $p_i$ is actually obtained by the detection circuit 60, and the time $T_{latch}$ when the measured value is latched into the PLL. If this lag was a constant value, then it would have no significance in the calculation of the timing estimate Fs. However, in practice the lag ΔT is found to vary in time, over a range of a clock cycle. As a result, each incremental phase measurement $p_i$ lies within a "zone of ambiguity" 84, as shown in FIG. 4, and it is generally not possible, based on the phase measurement itself, to resolve the actual incremental phase difference within this zone. However, because of its wide bandwidth, the PLL 62 is highly sensitive to this phenomena. In particular, errors in the phase measurement $p_i$ (due to ambiguity and noise) propagate through the PLL 62 and produce spurious excursions in the timing estimate Fs. This is true even when the PLL 62 is phase-locked to the input (i.e. the phase difference) signal. Since the timing estimate Fs is used to steer the desynchoniser PLL 56, any errors in the timing estimate Fs produces corresponding errors in the frequency f4 of the recovered data clock signal 58, and consequent timing jitter in the recovered signal 50.

It should be noted that this problem does not only occur at the transmitter, but also occurs at each node that bridges between different reference clock domains. Thus, for example, this problem will occur at boundaries between SONET islands.

Accordingly, methods and apparatus for reducing jitter by minimizing effects of phase measurement ambiguities are highly desired.

SUMMARY OF THE INVENTION

Accordingly, an object of the present invention is to provide methods and apparatus for reducing waiting time jitter.

Thus, an aspect of the present invention provides, in a system for rate adapting a data signal for transport through a synchronous network, a method of minimizing jitter. A phase difference is measured between a data clock synchronous with the data signal and a local clock of the synchronous network. A timing reference (F) indicative of a frequency difference between the asynchronous data signal and the local clock is measured using the measured phase difference. Calculation of the timing reference includes a step of compensating ambiguity in the measured phase difference.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and apparatus for reducing jitter by minimizing the effects of phase measurement ambiguities. Embodiments of the invention are described below, by way of example only, with reference to FIGS. 5a-9.

In general, the present invention operates by attenuating (or damping) the response of the timing estimate calculation to phase measurement jitter due to noise and ambiguity, without altering its linear response to larger variations due to the frequency difference (or ratio f1/f2) between the data clock signal 10 and the Tx local clock signal 26. This technique relies on the observation that the frequency ratio f1/f2 is dominated by low frequency (e.g. on the order of about 10 Hz or lower) variations due to wander or drift of the Tx local clock 22 and the clock recovery circuit 12. On the other hand, ambiguity (i.e. quantization error and lag) of the phase measurement, and noise tend to introduce jitter in the form of low magnitude high frequency (e.g. on the order of 10 kHz or higher) transients. As a result, the phase error signal 74 appearing at the output of the integrator 72 comprises a "true" component due to the actual frequency difference (or ratio f1/f2); an error component due to ambiguity; and noise. The magnitude of the true component increases monotonically as successive phase samples $p_i$ are latched into the PLL 62, and the error component and noise remain bounded within a comparatively narrow band about the true component. These characteristics enable suppression of both the error component due to ambiguity and noise, thereby permitting improved accuracy of the phase estimate Fs. In the following discussion, the present invention is described, by way of three representative alternative methods, namely: phase error non-linearity, notch filter and error estimation.

Phase Error Non-Linearity

In this technique, a non-linearity is introduced into the PLL response, so as to suppress excursions in the timing estimate Fs due to low-level variations in the phase error signal 74, which are associated with noise and phase measurement ambiguity. For larger magnitude variations in the phase error signal 74, the linear response of the PLL is preferably preserved. FIGS. 5a-5d illustrates a representative embodiment for accomplishing this result.

Figure 5A:
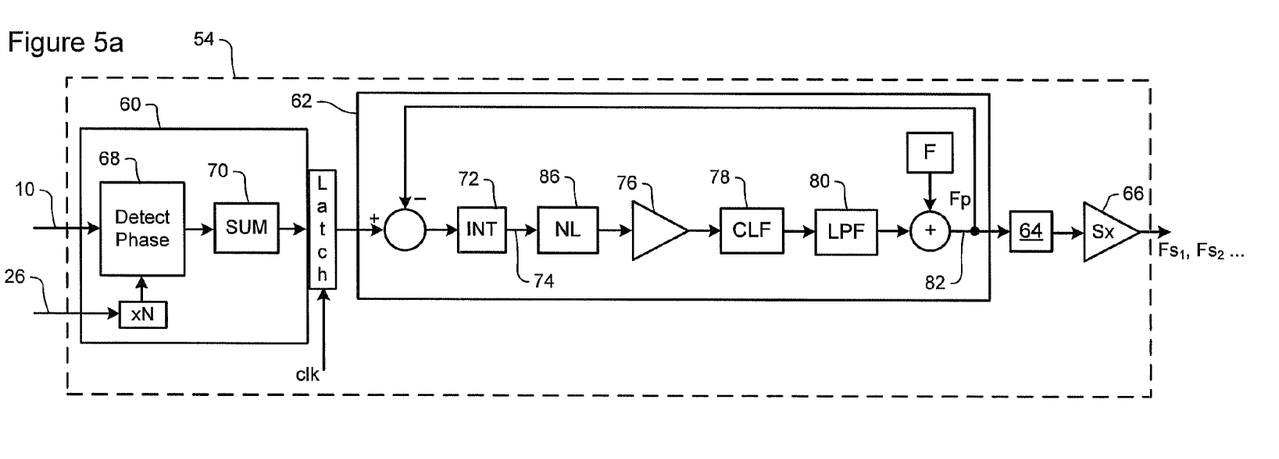
FIGS. 5a-5d schematically illustrating a circuit for calculating the timing estimate Fs in accordance with a first embodiment of the present invention.

In the embodiment of FIG. 5a, the phase measurement $p_i$ is obtained and periodically latched into the PLL 62 in the same manner as described above with reference to FIGS. 3 and 4. At the PLL input, the phase error 74 is calculated, as described above, and thus is the sum of true phase error component due to the frequency difference, the error component due to ambiguity, and noise. The phase error non-linearity is implemented using a non-linear operator 86 inserted into the PLL signal path immediately downstream of the integrator 72, and is used to suppress low-magnitude components in the phase error 74 supplied to the loop filter 78.

Figure 5B:
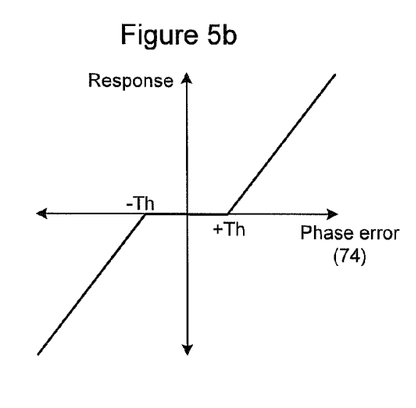
Figure 5C:
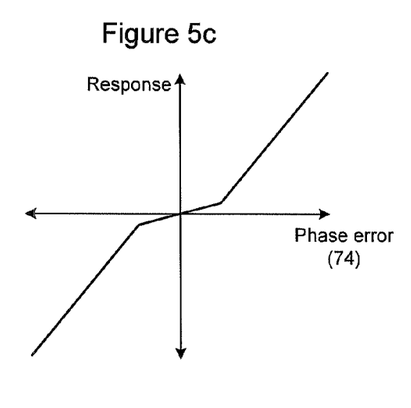
Figure 5D:
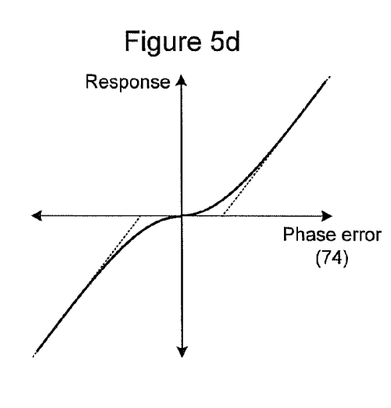

FIGS. 5b-5d illustrate response curves for three alternative embodiments of the non-linear operator 86. In the embodiment of FIG. 5a, the non-linear operator is implemented by way of a deadzone between positive and negative limits ±Th. As may be seen in FIG. 5b, the non-linear operator 86 response between the positive and negative limits ±Th is set to zero, so as to fully suppress low-level components of the phase error 74. Outside the deadzone, the absolute value of the response increases linearly for increasing phase error 74 magnitude. With this arrangement, the PLL 62 will be comparatively insensitive to low-magnitude fluctuations in the phase error 74. At the start of a cycle (e.g. at beginning of each frame or data block), this will produce an erroneous suppression of the "true" error component. However, as the number of phase measurement samples $p_i$ latched into the PLL 62 increases, so too does the magnitude of the "true" component of the phase error 74. Accordingly, by tracking the phase error 74 over a sufficient number of phase measurement samples $p_i$, it is possible to ensure that the PLL response is linear for the true component, while at the same time suppressing the response to ambiguity and noise.

The embodiment of FIG. 5c is similar to that of FIG. 5b, except that the non-linear operator 86 response between the positive and negative limits ±Th is not fixed at zero. Instead, the non-linear operator 86 response varies linearly between the positive and negative limits ±Th, but the slope of the response is significantly lower than that outside the positive and negative limits ±Th.

In both of the embodiments of FIGS. 5b and 5c, the positive and negative limits ±Th of the deadzone are preferably selected to encompass the estimated maximum magnitude of phase error components due to ambiguity and, if desired, noise.

In the embodiment of FIG. 5d, the non-linear operator 86 response is a continuous function (i.e. a polynomial) having a minimum slope at zero phase error 74, and becoming substantially linear for large magnitudes of the phase error 74.

Notch Filter

As an alternative to the non-linear operator 86 described above with respect to FIGS. 5a-5d, it is also possible to implement a notch filter function 88 to attenuate frequency components corresponding to the error component due to ambiguity. As may be seen in FIG. 6, such a notch filter 88 can be implemented within the digital PLL 62, for example at the same location as the non-linear operator 86 of FIG. 5a.

Figure 6:
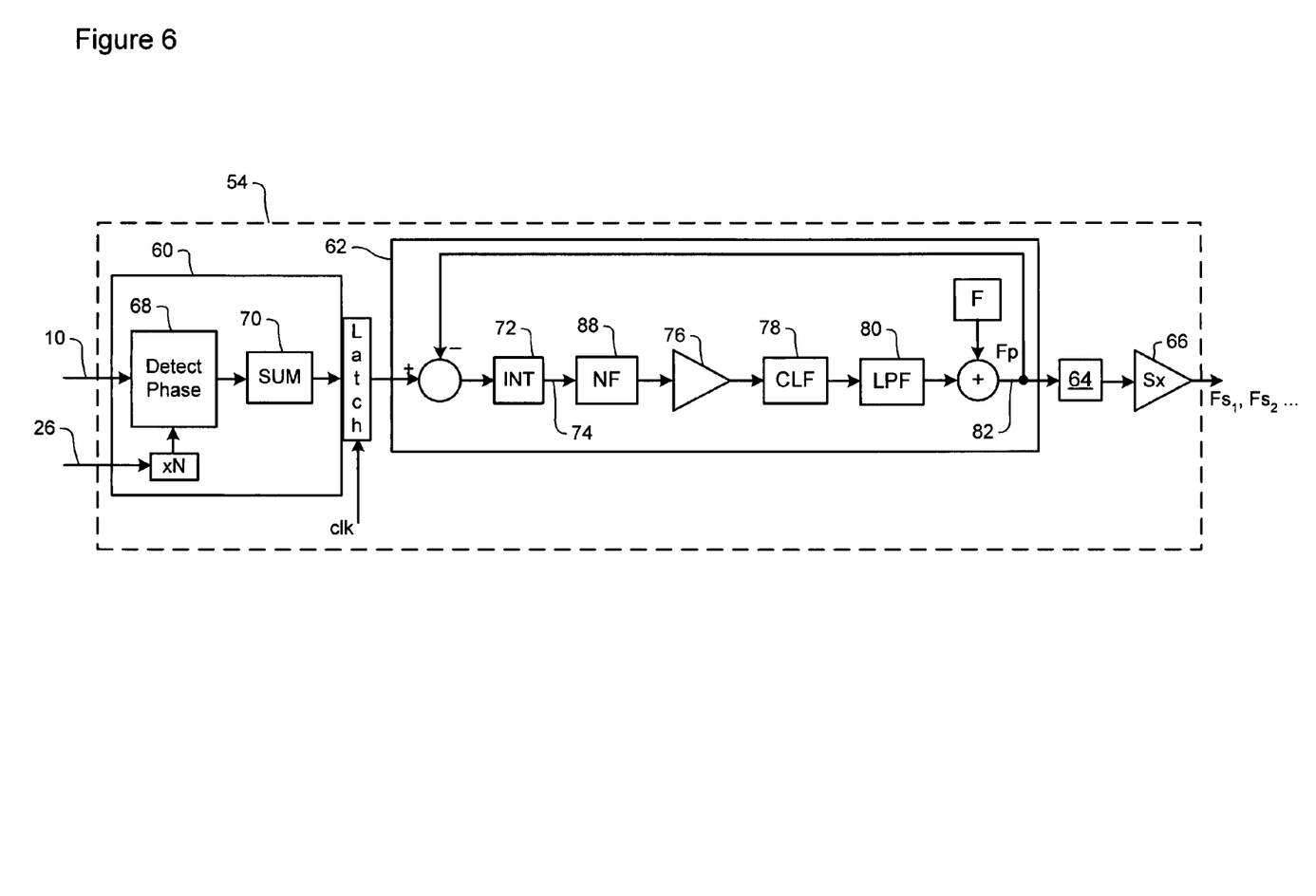
FIG. 6 is a block diagram schematically illustrating a circuit for calculating the timing estimate Fs in accordance with a second embodiment of the present invention.

As mentioned above, true component of the phase error 74 includes low frequency variations (on the order to 10 Hz) due to frequency wander, while ambiguity and noise introduce transients on the order of 10 KHz and higher. In this case, the notch filter function 86 can in fact be implemented using a low pass filter with a 3 dB roll-off of about 10 times higher than the PLL closed loop transfer function bandwidth. Thus, for a PLL having a closed loop transfer function bandwidth of about 150 Hz, the notch filter function 88 may be implemented using a low pass filter with a 3 dB roll-off of about 1500 Hz. This frequency separation enables the notch filter function 88 to attenuate components of the phase error 74 due to ambiguity and noise, without significantly altering the canonical loop behaviour in its bandwidth.

Error Estimation

In this approach, a compensation circuit is trained to suppress transients in the phase measurement samples $p_i$ which result from ambiguity and noise. In particular, FIGS. 7a and 7b illustrate operation of the phase detector 68, for the representative case of a frequency ratio of $$\frac{f1}{f2} = 0.375.$$

Figure 7A:
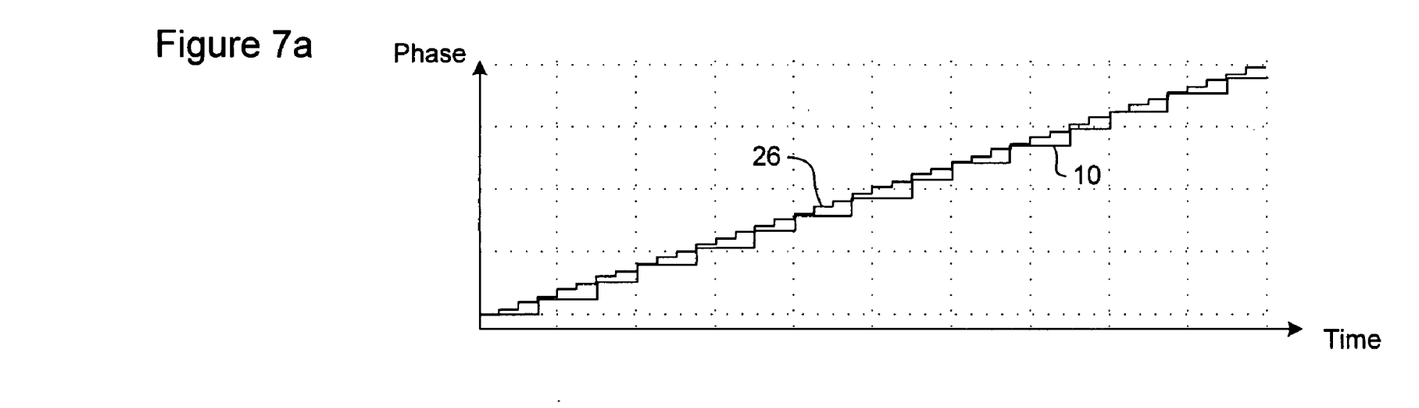
FIGS. 7a and 7b are charts showing operation of the phase detection circuit of the embodiments of FIGS. 3, 5 and 6.
Figure 7B:
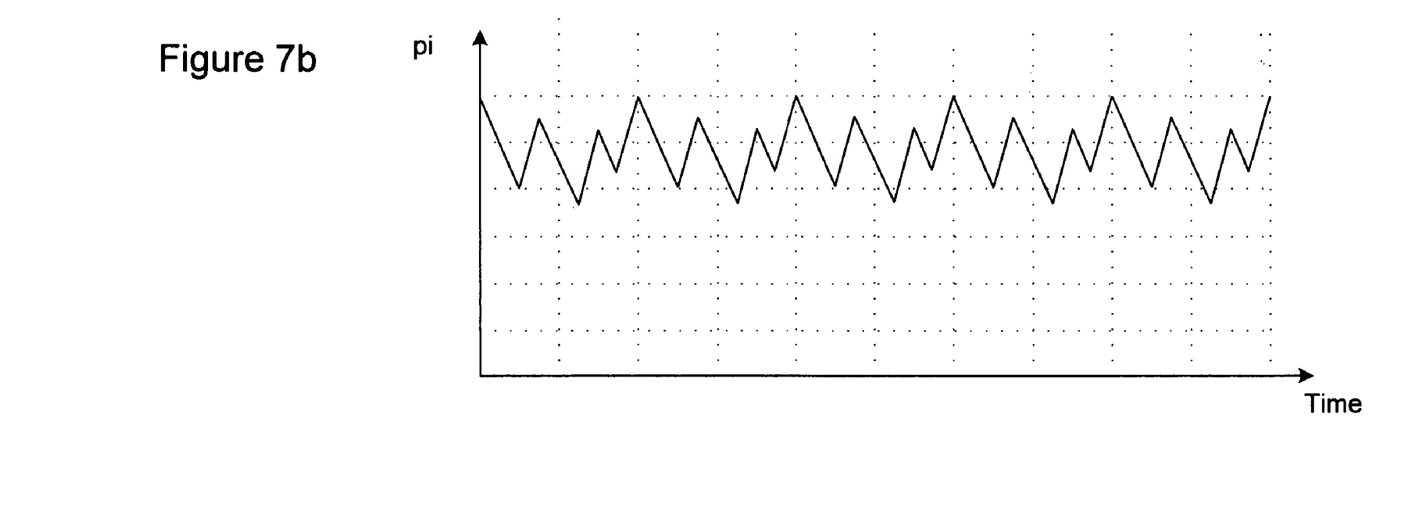

As may be seen in FIG. 7a, the phase of the Tx local clock signal 26 increases monotonically with a constant sample period T2. The phase of the data clock signal 10 is sampled (or oversampled, as the case may be) synchronously with the Tx local clock signal 26. As may be seen in FIG. 7b, this produces a saw-tooth pattern of phase samples at the output of the phase detector 68. Examination of this saw-tooth pattern reveals the following features:

it is the primary source of jitter in the timing estimate Fs;
the saw-tooth pattern has an expected value given by $$E\left[\frac{Tsaw}{T2}\right] = \frac{T1}{T1-T2},$$

where T1 is the period of the data clock signal 10 and T2 is the period of the Tx local clock signal 26;
estimated instantaneous values toggle within the range $$\left(\text{Floor}\left[\frac{T1}{T1-T2}\right], \text{Cieling}\left[\frac{T1}{T1-T2}\right]\right);$$

The slope of the waveform within one cycle is constant, and corresponds with the ratio f1/f2; and
the initial value of the waveform within each cycle may change.

Figure 8:
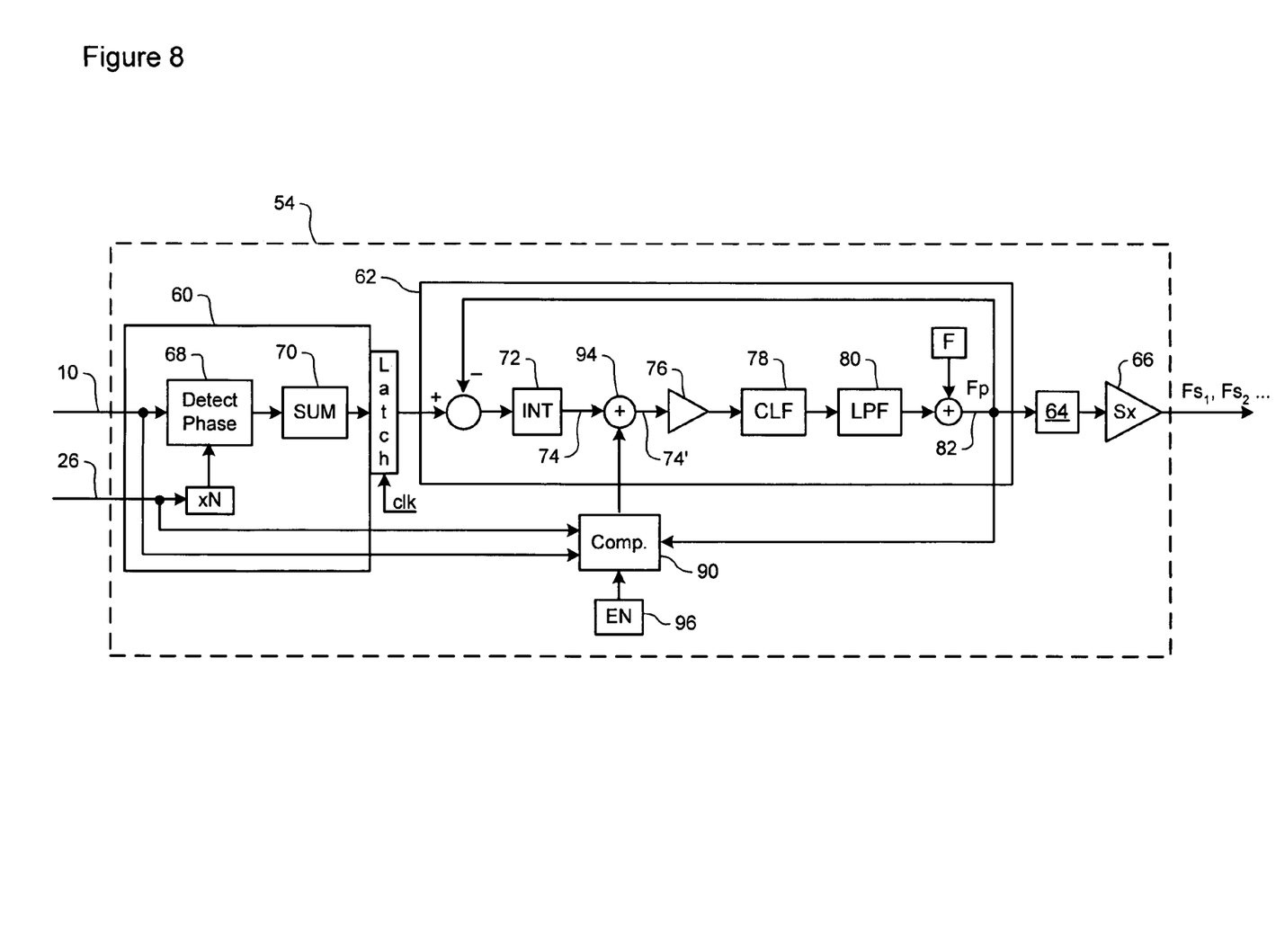
FIG. 8 is a block diagram schematically illustrating a circuit for calculating the timing estimate Fs in accordance with a third embodiment of the present invention.

These characteristics enable the jitter in the timing estimate Fs to be strongly attenuated by estimating successive instantaneous values of the saw-tooth pattern, at a timing of the Tx local clock 26, and subtracting these values from the phase error signal 74. FIG. 8 illustrates a representative embodiment implementing this approach.

As may be seen in FIG. 8, a compensation circuit 90 computes successive estimates of the instantaneous values of the saw-tooth pattern, based on the data clock signal 10, the Tx local clock signal 26 and the predicted timing estimate Fp 82 computed at the PLL output. As described above, the instantaneous values of the saw-tooth pattern are subtracted (at 94) from the phase error signal 74. The resulting "smoothed" phase error signal 74' is then processed through the remainder of the PLL as described above. This operation yields timing estimates Fs with significantly reduced jitter due to noise and ambiguity.

As will be appreciated, during an initial (acquisition) stage, the PLL output 82 gradually converges to a stable value, at which the predicted timing estimate Fd accurately reflects the frequency ratio f1/f2 (plus jitter and noise). Due to the damped response of the PLL 62, this start-up phase may involve on the order of 1000 or more update cycles of the PLL 62. During this period, values of the predicted timing estimate Fd will tend to be dominated by PLL error, and thus will not be usable for calculating instantaneous values of the saw-tooth pattern. Accordingly, operation of the compensation circuit 90 is preferably controlled by an "enable" signal 96. By this means, the compensation circuit 90 can be disabled (or equivalently, it can be controlled to discard calculated saw-tooth pattern values) during an acquisition phase of the PLL 62. Once the PLL 62 has stabilized, the "enable" signal 96 can be toggled to enable operation of the compensation circuit 90, so that calculation of instantaneous values of the saw-tooth pattern can proceed as described above. The duration of the acquisition period may, for example, be based on an analysis of the PLL output 82, which permits operation of the compensation circuit 90 to be enabled as soon as the PLL 62 stabilizes. Alternatively, the enable signal 96 can be triggered by a count of PLL update cycles, which is selected, based on known performance of the PLL 62, to guarantee that the PLL 62 will have stabilized before the compensation circuit 90 is enabled.

The embodiment(s) of the invention described above is(are) intended to be exemplary only. The scope of the invention is therefore intended to be limited solely by the scope of the appended claims.

We claim:

1. In a system for rate adapting a data signal for transport through a synchronous network, a method of minimizing jitter comprising steps of:
a phase detector measuring an incremental phase difference between a data clock signal synchronous with the data signal and a local clock signal of the synchronous network; a digital phase locked loop calculating a phase error based on the measured incremental phase difference and a predicted timing estimate (Fp) indicative of a frequency difference between the data clock signal and the local clock signal, filtering the phase error to attenuate jitter due to at least ambiguity in the measured incremental phase difference and calculating an updated predicted timing estimate Fp using the filtered phase error.

2. A method as claimed in claim 1, wherein the steps of calculating the phase error signal, filtering the phase error signal and calculating the updated predicted timing estimate Fp are performed by a digital phase locked loop (PLL), and wherein the step of filtering the phase error comprises a step of attenuating a response of the PLL to small-signal components of the phase error.

3. A method as claimed in claim 2, wherein the step of attenuating a response of the PLL comprises either one of:
  providing a non-linear operator for selectively suppressing low magnitude components of the phase error; and
  providing a notch filter operator for attenuating at least high frequency components of the phase error.

4. A method as claimed in claim 3, wherein the non-linear operator comprises any one of:
  a deadzone defined between respective positive and negative threshold values, such that a magnitude of the phase error lying between the positive and negative threshold values is set to zero;
  a rectilinear operator function having a first linear response between positive and negative threshold values, and a second linear response extending above and below the positive and negative threshold values, respectively, wherein a slope of the first linear response is less than a slope of the second linear response; and
  a continuous function having a minimum slope at zero phase error, and becoming substantially linear for large magnitudes of the phase error.

5. A method as claimed in claim 4, wherein the predetermined threshold is selected based on a maximum estimated error component of the measured incremental phase difference.

6. A method as claimed in claim 3, wherein the notch filter comprises a low-pass filter having a 3 dB roll-off at a frequency corresponding to at least 10-times a closed loop transfer function bandwidth of the PLL.

7. A method as claimed in claim 2, wherein the step of filtering the phase error comprises steps of:
  estimating a jitter component of the phase error due to ambiguity in the measured incremental phase difference; and
  subtracting the estimated jitter component from the phase error.

8. A method as claimed in claim 7, wherein the estimated jitter component is a function of the period T1 of the data clock signal; the period T2 of the local clock signal; and the predicted timing estimate Fp.

9. A method as claimed in claim 7, further comprising steps of selectively enabling and disabling at least the step of subtracting the estimated jitter component from the phase error.

10. A method as claimed in claim 9, wherein the step of subtracting the estimated jitter component from the phase error is selectively disabled during an acquisition phase of the PLL start-up, and enabled otherwise.

11. A method as claimed in claim 9, wherein a duration of the acquisition phase of the PLL start-up is based on a rate change of the predicted timing estimate Fp over time.

12. A method as claimed in claim 9, wherein a duration of the acquisition phase of the PLL start-up is based on a predetermined number of update cycles of the PLL.

* * * * *